United States Patent [19]

Kennedy et al.

[11] Patent Number: 4,995,494
[45] Date of Patent: Feb. 26, 1991

[54] PRESSURE-RESPONSIVE FLUID CHECK VALVE AND METHOD FOR VISCOUS FLUID CLUTCH

[75] Inventors: Lawrence C. Kennedy, Kettering; Ronald G. Huth, Huber Heights, both of Ohio

[73] Assignee: General Motors Corporation, Detroit, Mich.

[21] Appl. No.: 459,406

[22] Filed: Dec. 29, 1989

Related U.S. Application Data

[63] Continuation of Ser. No. 355,535, May 22, 1989, Pat. No. 4,924,987.

[51] Int. Cl.⁵ ............................................. F16D 35/00
[52] U.S. Cl. .................................. 192/58 B; 192/82 T
[58] Field of Search ........................... 192/58 B, 82 T; 123/41.12

[56] References Cited

U.S. PATENT DOCUMENTS

| | | | |
|---|---|---|---|
| 3,174,600 | 3/1965 | Oldberg | 192/58 |
| 3,259,219 | 7/1966 | Boyd | 192/82 T |
| 3,259,220 | 7/1966 | Roper | 192/58 B |
| 3,323,623 | 6/1967 | Roper | 192/58 |
| 3,339,689 | 9/1967 | Sutaruk | 192/58 |
| 3,419,122 | 12/1968 | Connelly | 192/58 |
| 3,490,686 | 1/1970 | Weir | 230/270 |
| 3,907,084 | 9/1975 | Hall | 192/82 T X |
| 3,983,981 | 10/1976 | Snodgrass et al. | 192/58 B |
| 4,271,946 | 6/1981 | Bridge | 192/58 B |
| 4,103,765 | 8/1978 | Tinholt | 192/58 B |
| 4,203,765 | 8/1978 | Tinholt | 192/58 B |
| 4,312,433 | 1/1982 | Bopp | 192/58 B |
| 4,403,684 | 9/1983 | Haeck | 192/58 B |
| 4,531,621 | 7/1985 | Hazel | 192/58 B |
| 4,544,053 | 10/1985 | Yamaguchi et al. | 192/58 B |
| 4,564,094 | 1/1986 | Storz | 192/58 B |
| 4,570,771 | 2/1986 | Yamaguchi et al. | 192/58 B |
| 4,606,445 | 8/1986 | Rockey | 192/58 B |

FOREIGN PATENT DOCUMENTS 2099960A 12/1982 United Kingdom.

*Primary Examiner*—Rodney H. Bonck
*Assistant Examiner*—Nicholas Whitelaw
*Attorney, Agent, or Firm*—A. Michael Tucker

[57] ABSTRACT

A viscous fluid fan clutch assembly for a vehicle includes an internally-mounted pump plate for separating a working chamber from a reservoir. A plurality of pressure-sensitive fluid check valves are provided in the pump plate to permit only one-way fluid flow from a pumping chamber to the reservoir. Each check valve includes an interior chamber having a pair of angled side walls which terminate at a normally-closed outlet. When a predetermined fluid pressure is achieved in the pumping chamber, the side walls are forced apart to open the outlet. The closing of the outlet is not dependent upon fluid pressure in the reservoir.

14 Claims, 4 Drawing Sheets

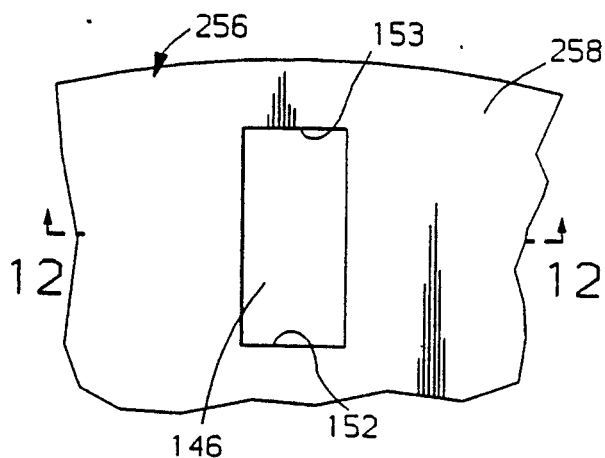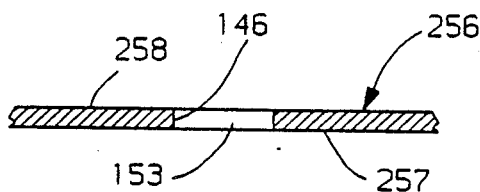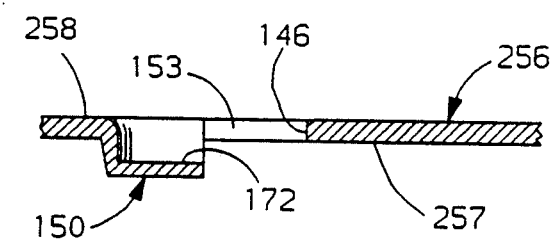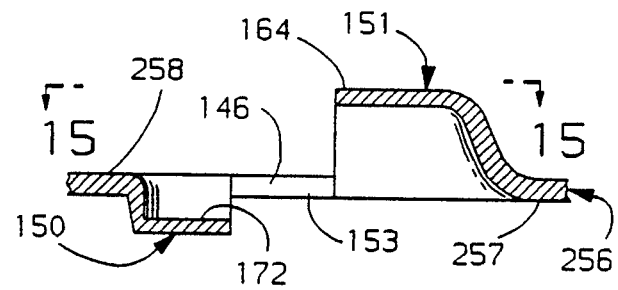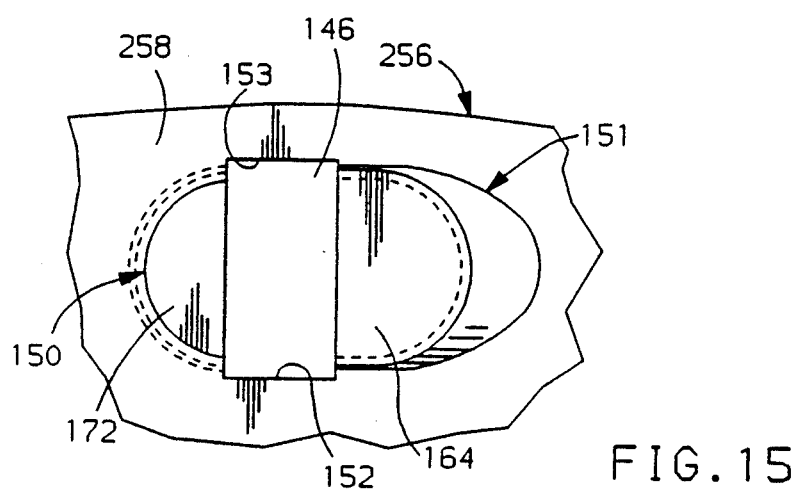

PRESSURE-RESPONSIVE FLUID CHECK VALVE AND METHOD FOR VISCOUS FLUID CLUTCH

This is a continuation-in-part of application Ser. No. 07/355,535, filed May 22, 1989 and now U.S. Pat. No. 4,924,987.

BACKGROUND OF THE INVENTION

1. Field of the Invention

The present invention relates generally to a viscous fluid coupling device. In particular, the present invention is concerned with a pressure-responsive fluid check valve and method for a viscous fluid clutch.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the airflow noise caused by fan rotation and the load on an engine, resulting in horsepower gain and improved fuel economy.

Generally, a clutch plate, housed within the clutch assembly, having lands and grooves is mated to the body having complementary lands and grooves. A pump plate divides the assembly into a pair of internally-contained chambers, a working chamber and a reservoir. Gates in the pump plate permit selective flow of a viscous fluid from the reservoir to the working chamber and into a shear zone between the lands and grooves of the body and clutch plate. Fluid shear in the lands and grooves transfers input torque from the clutch plate to drive the body and the attached fan.

When cooling is not required, gates in the pump plate are closed and the fluid in the shear zone is pumped into a pumping chamber. Orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

When an engine is not running, fluid in the reservoir may settle at an equilibrium level in a conventional clutch assembly. Fluid pressure may cause the migration of fluid from the reservoir into the pumping chamber through the pump plate orifices and into the shear zone. When an engine is next started, fluid that has migrated into the shear zone results in annoying high-speed operation of the fan. Such high-speed operation creates unwanted airflow noise from the fan blades. Also, excessive rotation of the fan of a cold engine increases the engine warm-up period.

The art continues to seek improvements. It is desirable that a viscous fluid clutch assembly provide thermostatic operation of a fan when cooling is required. Furthermore, it is desirable that a clutch assembly prevent the migration of fluid from a reservoir to the shear zone when the engine is not in operation, thereby eliminating high-speed operation and unwanted airflow noise when a cold engine is started.

SUMMARY OF THE INVENTION

The present invention includes a viscous fluid drive device particularly adaptable for a fan clutch assembly of a vehicle. The present fan clutch assembly utilizes a pressure-sensitive check valve to prevent the migration of fluid through a pump plate orifice from a reservoir into a pumping chamber, particularly when the engine is not running.

The present invention relates to a viscous fluid fan clutch assembly for a vehicle. The clutch assembly includes an internally-mounted pump plate for separating a working chamber from a reservoir. A plurality of pressure-sensitive fluid check valves are provided in the pump plate to permit only one-way fluid flow from a pumping chamber to the reservoir. Each check valve includes an interior chamber having a pair of angled side walls which terminate at a normally-closed outlet. When a predetermined fluid pressure is achieved in the pumping chamber, the side walls are forced apart to open the outlet. The closing of the outlet is not dependent upon fluid pressure in the reservoir.

BRIEF DESCRIPTION OF THE DRAWINGS

FIG. 11 is a front elevational view of a portion of the pump plate illustrating a first step of a method for forming the orifice and retention tabs for receiving the check valve illustrated in FIGS. 5-10.

FIG. 12 is a sectional view taken along line 12—12 of FIG. 11.

FIG. 13 is a sectional view similar to FIG. 12 illustrating a second step of a method for forming the orifice and retention tabs for receiving the check valve of FIGS. 5-10.

FIG. 14 is a sectional view similar to FIG. 13 illustrating a third step for forming the orifice and retention tabs for receiving the check valve of FIGS. 5-10.

FIG. 15 is a front elevational view of the pump plate, orifice and retention tabs of FIG. 14.

DETAILED DESCRIPTION OF THE PREFERRED EMBODIMENTS

Figure 1:
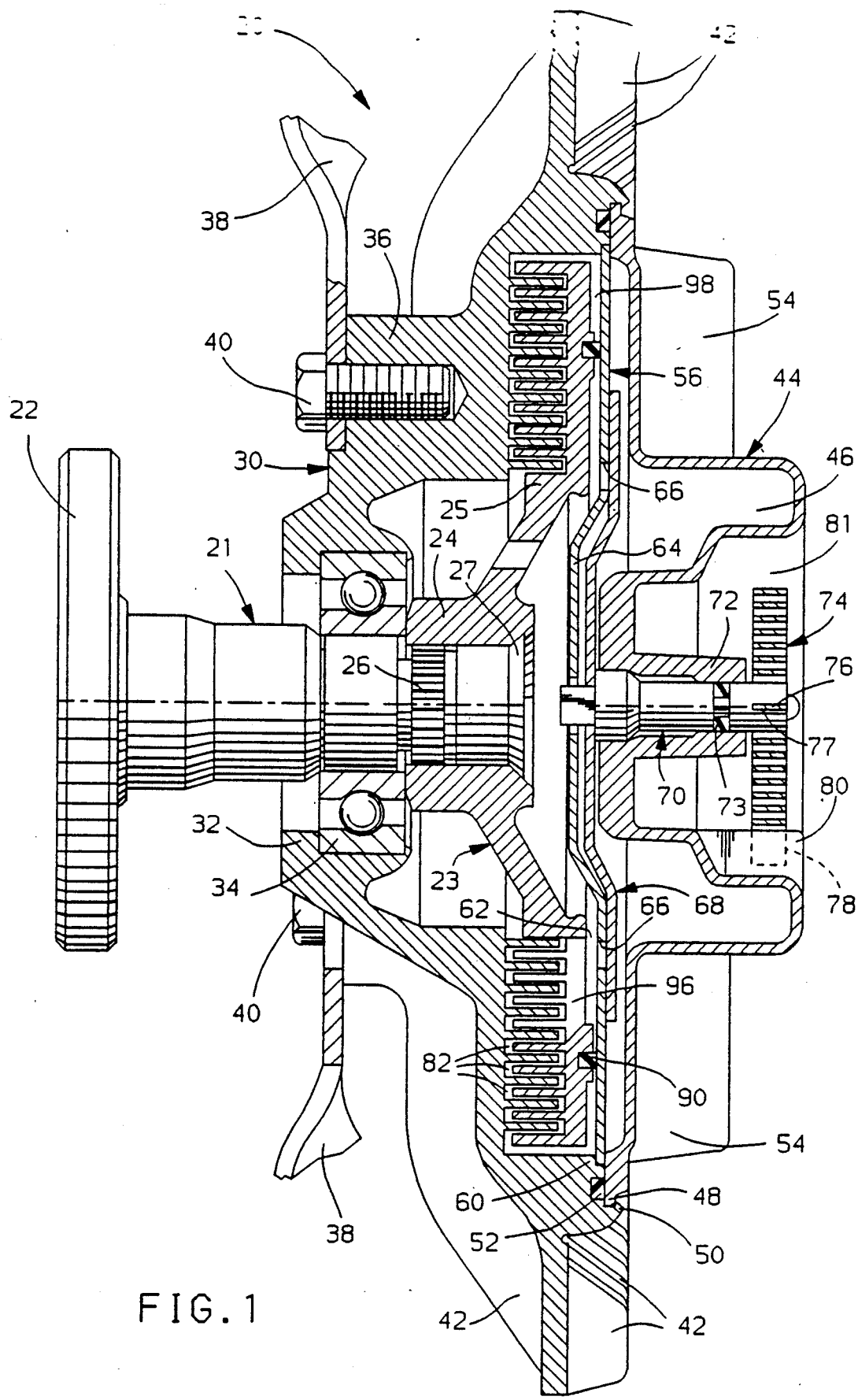
FIG. 1 is a sectional view of a viscous fluid clutch assembly and attached fan incorporating a pump plate of the present invention.

A viscous fluid clutch assembly indicated generally at 20 is illustrated in FIG. 1. The clutch assembly 20 includes a rotatably driven shaft indicated generally at 21. The shaft 21, which can be provided with multiple steps as illustrated in FIG. 1, preferably terminates at its first or innermost end in a flange 22. The flange 22 can be secured to a conventional engine-driven water pump pulley (not illustrated) to drive the clutch assembly 20 as described below.

A clutch plate indicated generally at 23 includes a central hub portion 24 and an annular disk portion 25. The central hub portion 24 receives a knurled portion 26 of the shaft 21 to secure the clutch plate 23 on the shaft 21. In this construction, the rotational drive of the shaft 21 is transferred to the clutch plate 23. A second end of the shaft 21 can be machined as indicated at 27 to retain the clutch plate 23 on the shaft 21. It is appreciated that other constructions, e.g., splining, can be utilized to drivingly connect the clutch plate 23 with the shaft 21.

A housing indicated generally at 30 is a dished member having a hub 32 rotatably mounted on the shaft 21 by a bearing 34. A plurality of radially extending bosses 36 are formed on the exterior face of the housing 30. A multi-bladed fan 38, partially illustrated in FIG. 1, is attached by threaded fasteners 40 to the bosses 36. A plurality of fins 42 is provided on the outer surface of the housing 30 to dissipate heat transferred from a viscous fluid (not illustrated) contained by the assembly 20.

A cover indicated generally at 44 is mounted to a front face of and cooperates with the housing 30 to form a reservoir 46 for the viscous fluid as described below. The cover 44 is a dished member having an annular outer edge 48 secured to the housing 30 by an annular retainer lip 50 spun over from the material of the housing 30. An annular seal 52, e.g., a formed-in-place gasket, is interposed between the edge 48 and a front face of the housing 30 to prevent leakage from the interior of the assembly 20. A plurality of fins 54 is provided on the outer surface of the cover 44 to dissipate heat transferred from the fluid.

A disk-like pump plate 56 is installed in the interior of the assembly 20. The pump plate 56 is positioned on a shoulder 60 of the housing 30 and is drivingly secured to the housing 30 by the cover 44. The pump plate 56 divides the interior of the assembly 20 into a working chamber 62 and the fluid reservoir 46. In the view of FIG. 1, the working chamber 62 is the interior volume to the left of the pump plate 56, while the reservoir 46 is the interior volume to the right of the pump plate 56. For purposes of this specification, a first or rear surface 57 of the pump plate 56 is in communication with the working chamber 62 and a second or front surface 58 of the pump plate 56 is in communication with the reservoir 46. The pump plate 56 includes a central depression 64 which is fitted in the hub portion 20 of the clutch plate 23.

A pair of diametrically opposed gates or openings 66 are provided in the portion of the pump plate 56 outbound of the depression 64. Hydraulic pressure causes the flow of fluid through the gates 66 from the reservoir 46 into the working chamber 62.

A rotatable control arm 68 controls the fluid flow into the working chamber 62 by covering and uncovering the gates 66. The control arm 68 is drivingly connected to a shaft 70 rotatably mounted in a tubular hub 72 formed in the cover 44. An O-ring seal 73 is mounted in an annular groove in the shaft 70 and makes peripheral contact with the inner wall of the hub 72 to prevent fluid leakage to the exterior of the assembly 20.

A bimetallic coil 74 is mounted at a first end 76 in a slot 77 on the forward end of the shaft 70. The second end 78 of the bimetallic coil 74 is mounted in a tab 80 in the exterior of the cover 44. Preferably, the bimetallic coil 74 is recessed within a cavity 81 surrounding the hub 72. The bimetallic coil 74 responds to the ambient air temperature surrounding the cover 44. An increase in air temperature causes the coil 74 to expand, thereby rotating the control arm 68 to uncover the gates 66 in the pump plate 56. When the air temperature has decreased to a predetermined level, the bimetallic coil 74 contracts, causing the shaft 70 and control arm 68 to rotate back to their original positions, thereby covering the gates 66 in the pump plate 56 and blocking fluid flow.

A fluid shear zone 82 is formed by the space between the interleaved concentric annular lands or ridges 84 and grooves formed on a rear or inner surface of the disk portion 25 of the clutch plate 23 and corresponding concentric annular lands or ridges 86 and grooves formed on an interior surface of the housing 30. Fluid sheared in the shear zone 82 transmits input torque from the rotatably driven clutch plate 23 to provide hydraulic drive of the housing 30 and the attached fan 38.

Figure 2:
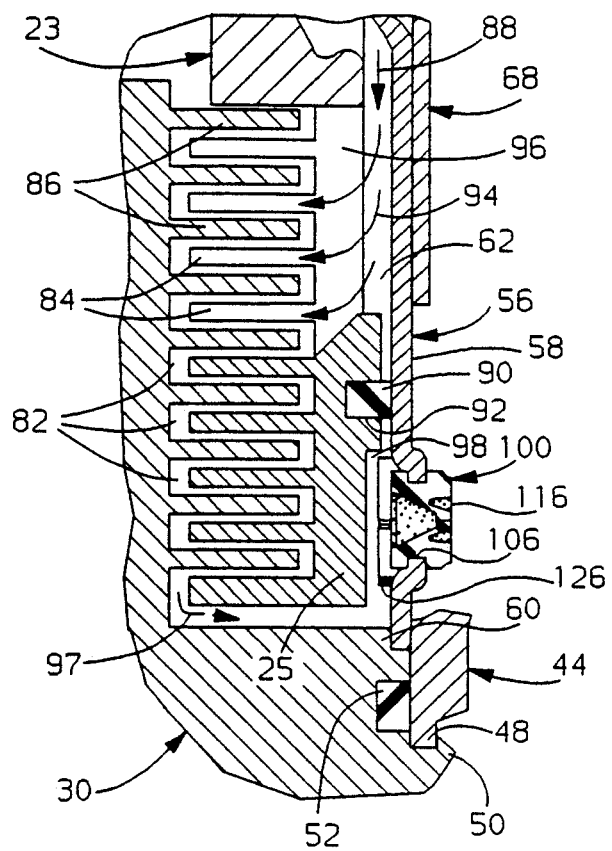
FIG. 2 is an enlarged view of a portion of the clutch assembly of FIG. 1 wherein the pump plate has been rotated to illustrate a first embodiment of a pressure-sensitive check valve mounted on the pump plate.

Fluid flow through the shear zone 82 is illustrated best in FIG. 2. When the control arm 68 is rotated to uncover the gates 66, fluid flows from the reservoir 46 into the working chamber 62. Centrifugal forces of the rotating clutch assembly 20 direct the fluid into a radial flow as indicated at directional arrow 88 between the pump plate 56 and the clutch plate 23. A blocking ring 90, preferably formed from TEFLON or a similar material, is provided in an annular groove 92 in a front surface of the clutch plate 23. Radial flow 88 encounters the blocking ring 90 and is redirected to axial flow indicated at directional arrows 94 to flow through a plurality of passages 96 provided in the ridges 84 and grooves of the clutch plate 23. Centrifugal forces cause the fluid to be dispersed radially outwardly throughout the shear zone 82. Fluid friction in the shear zone 82 transmits the rotation of the clutch plate 23 to the housing 30. As the housing 30 rotates, the attached fan 38 is rotated to draw cooling air through a radiator (not illustrated) and cool an internal combustion engine in a well-known manner.

Fluid exits the shear zone 82 as indicated at directional arrow 97 into an annular pumping chamber 98 formed and bounded by the clutch plate 23, the pump plate 56 and the blocking ring 90. Fluid is pumped from the pumping chamber 98 back to the reservoir 46 through a plurality of fluid control elements provided in the pump plate 56 as described below.

Figure 4:
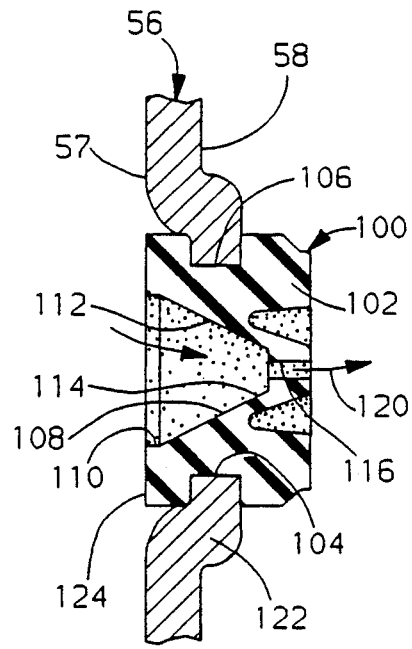
FIG. 4 is a greatly enlarged sectional view of a portion of the pump plate of FIG. 2 illustrating fluid flow through the pressure-sensitive check valve.
Figure 3:
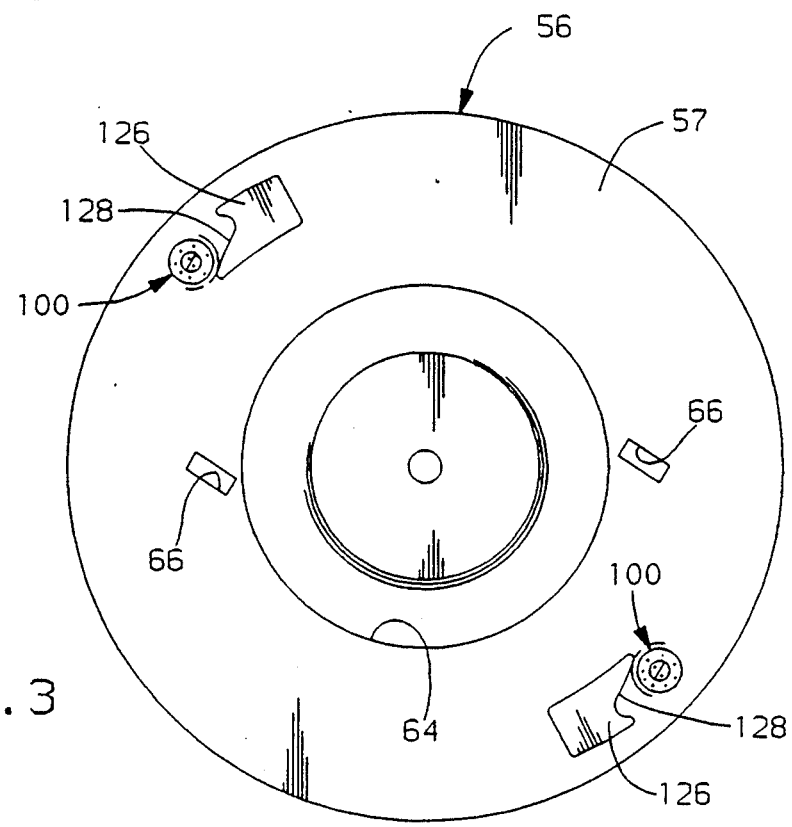
FIG. 3 is a reduced rear elevational view of the present pump plate, removed from the clutch assembly of FIG. 1 for purposes of clarity of illustration, illustrating a pair of pressure-sensitive check valves and respective wipers.
Figure 5:
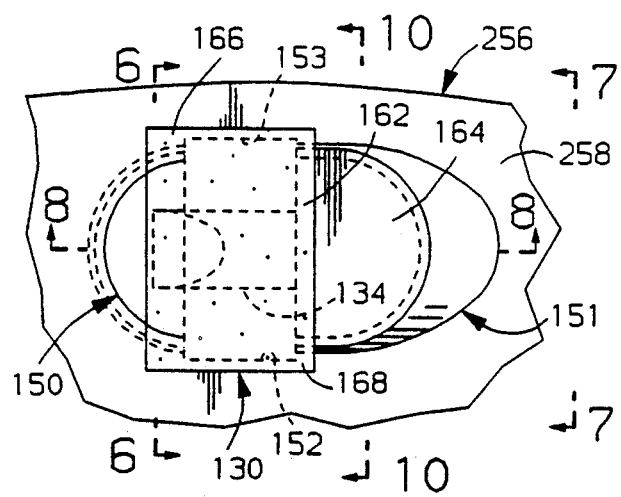
FIG. 5 is a greatly enlarged front elevational view of a second embodiment of the present pressure-responsive check valve mounted on a pair of retention tabs provided in the partially-illustrated pump plate, wherein the pump plate has been removed from the clutch assembly for purposes of clarity of illustration.
Figure 6:
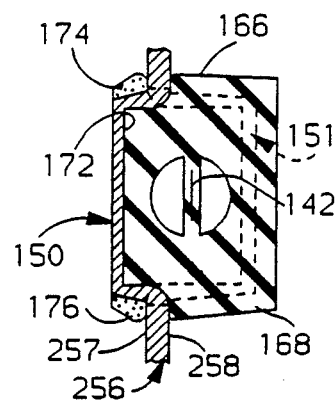
FIG. 6 is a sectional view taken along line 6—6 of FIG. 5.
Figure 7:
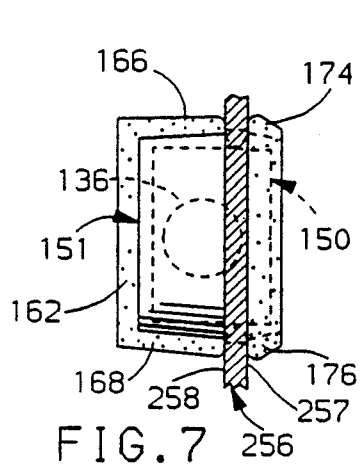
FIG. 7 is an end view taken along line 7—7 of FIG. 5.

A first preferred embodiment of the present fluid control element indicated generally at 100 is illustrated in FIGS. 2, 3 and 4. The fluid control element 100 comprises a resilient, generally cylindrical body 102 having a circumferential groove 104 for receiving the pump plate 56 at a circular opening 106. An interior chamber 108 having an inlet 110 in communication with the pumping chamber 98 is provided in the body 102. The interior chamber 108 includes a pair of angled side walls 112 and 114 which terminate at a normally-closed outlet 116. When the fluid pressure in the pumping chamber 98 reaches a predetermined level, fluid in the interior chamber 108 forces the side walls 112 and 114 apart so that fluid can flow through the outlet 116, as indicated by directional arrows 120 in FIG. 4.

The present fluid control element 100 is responsive to fluid pressure and operates during the entire operating temperature range of the fluid. The opening and closing of the normally-closed outlet 116 is a function of the pressure in the pumping chamber 98, and is not related to the pressure in the reservoir 46. Upon the application of a predetermined fluid pressure to the side walls 112 and 114, the outlet 116 opens. When the pressure is reduced to a predetermined level, the outlet 116 closes. Since the outlet 116 does not require any fluid pressure from the reservoir 46 to close, the fluid control element 100 can be referred to as a zero-pressure-to-close valve. It is also noted that fluid movement in the reservoir 46 does not interfere with actuation of the fluid control element 100. The closing of the outlet 116 is not related to fluid pressure in the reservoir 46.

It is preferred that the fluid control element 100 be molded from a resilient material, e.g., rubber. Preferably, the opening 106 is provided in a depression 122 formed in the pump plate 56 by stamping or the like so that an inlet surface 124 of the fluid control element 100 is substantially flush or planar with the rear surface 57 of the pump plate 56 so as not to impede the flow of fluid into the interior chamber 108.

The construction of the present fluid control element 100 provides an economical and effective check valve for preventing the migration of fluid from the reservoir 46 back into the pumping chamber 98 and the shear zone 82. When an engine is shut off, the clutch assembly 20 stops rotating. The prevention of fluid migration back into the shear zone 82 eliminates undesirable high-speed clutch operation when a cold engine is started, thereby significantly reducing annoying airflow noise created by the fan 38.

To improve pumping efficiency, a well-known wiper 126 can be mounted on the rear surface 57 of the pump plate 56 adjacent each fluid control element 100. Each wiper 126 can include a scoop surface 128 and is mounted upstream of the fluid control element 100. As viewed in FIG. 3, a counterclockwise rotation of the pump plate 56 forces fluid into the scoop surface 128, thereby increasing fluid pressure and fluid flow through the outlet 116. In other embodiments, the wipers 126 can be formed by any suitable means, e.g., as projecting elements stamped or pressed into the pump plate 56.

A second preferred embodiment of the present fluid control element indicated generally at 130 is illustrated in FIGS. 5-10. The fluid control element 130 is mounted on a disk-like pump plate 256 which is similar to and substituted for pump plate 56 in the assembly 20. For purposes of this description, the pump plate 256 includes rear face 257 in communication with the working chamber 62 and the pumping chamber 98 and a front face 258 in communication with the reservoir 46.

The fluid control element 130, preferably formed from a resilient material, comprises a generally rectangular body 132 having an interior chamber 134. An inlet 136 to the chamber 134 is provided in communication with the pumping chamber 98. The interior chamber 134 includes a pair of angled side walls 138 and 140 which terminate at a normally-closed outlet 142. As with similar elements in fluid control element 100, side walls 138 and 140 are forced apart to open outlet 142 when the pressure in the pumping chamber 98 reaches a predetermined level. When the fluid pressure drops below a predetermined level, the outlet 142 returns to its closed position.

Figure 8:
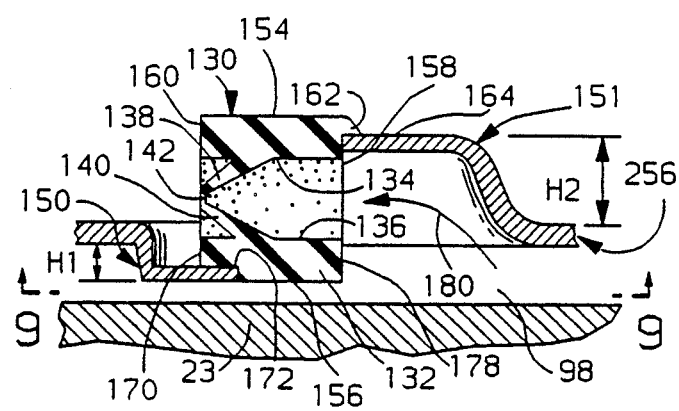
FIG. 8 is a sectional view taken along line 8—8 of FIG. 5 including a partially-illustrated clutch plate.
Figure 9:
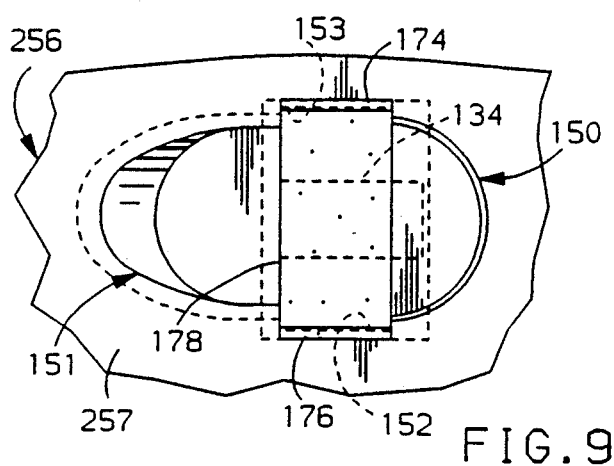
FIG. 9 is a rear elevational view taken along line 9—9 of FIG. 7.
Figure 10:
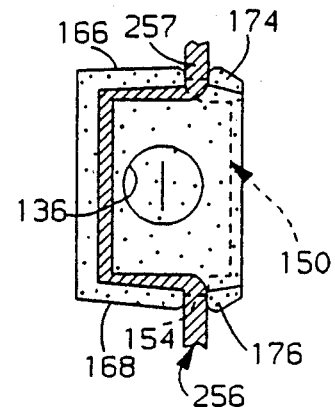
FIG. 10 is a sectional view taken along line 10—10 of FIG. 5.

The fluid control element 130 is received in an opening 146 (FIG. 11) provided in the pump plate 256 and mounted on a pair of retention tabs 150 and 151. The first retention tab 150 is formed as a depression in the pump plate 256 and projects into the pumping chamber 98. As illustrated in FIG. 8, the height H1 of the tab 150 must be less than the distance between the pump plate 256 and the clutch plate 23. The second retention tab 151 is formed on the opposite side of the opening 146 and projects into the reservoir 46. The height H2 of the tab 151 must be less than the distance between the pump plate 256 and the cover 44. The opening 146 is completed by opposite side walls 152 and 153 illustrated best in FIGS. 11 and 15.

For purposes of this specification, the fluid control element 130 is described from the orientation illustrated in FIG. 8. The fluid control element 130 is a generally rectangular member having a top surface 154 in communication with the reservoir 46 and a bottom surface 156 in communication with the pumping chamber 98. The top and bottom surfaces 154 and 156 are substantially parallel with the pump plate 256. A front surface 158 includes the inlet 136 and a rear surface 160 includes the outlet 142. A forwardly-projecting lip 162 is formed with the top surface 154 and provides a sealing surface overlapping and spanning an outer surface 164 of the second retention tab 151. The lip 162 extends over the second retention tab 151 in a pair of opposite side walls 166 and 168 formed with the top surface 154.

The bottom surface 156 of the fluid control element 130 includes an indentation or step 170 which is fitted on an inner surface 172 of the first retention tab 150. Forward of the step 170, the bottom surface 156 terminates in a pair of opposite locking flanges 174 and 176 (FIGS. 6, 7, 9 and 10) which project outwardly beyond the respective side walls 152 and 153 of the opening 146. When the fluid control element 130 is inserted into the opening 146, the locking flanges 174 and 176 are resiliently compressed until the step 170 is seated on the inner surface 172. Once in place, the locking flanges 174 and 176 expand to their original position and are positioned against the rear surface 257 of the pump plate 256 adjacent respective side walls 152 and 153.

A fluid encountering surface 178 is provided on the portion of the front face 158 between the inlet 136 and the bottom surface 156. The fluid encountering surface 178 projects into the pumping chamber 98 functioning as a fluid dam to create a pressure rise very similar to the wiper 126 described earlier, thereby improving pump-out through the fluid control element 130. While the fluid encountering surface 178 is shown as planar, it is appreciated that other shapes, including curved or scooped surfaces, are within the scope of this invention.

A method of forming the opening 146 and retaining tabs 150 and 151 for receiving the fluid control element 130 is illustrated in FIGS. 11-15. First, near the outer periphery of the pump plate 256, an opening 146 is pierced or stamped into the pump plate 256. While a rectangular opening 146 is illustrated, it is appreciated that other shapes are within the scope of this invention. Second, a forming operation with a punch and die draws a portion of the pump plate 256 adjacent the opening 146 into the first retaining tab 150. Third, a forming operation is performed on a portion of the pump plate 256 opposite the opening 146 from the first retaining tab 150 to draw the second retaining tab 151. If desired, these steps can be rearranged or combined.

Installation of the fluid control element 130 is accomplished by fitting the step 170 onto the inner surface 172 of the first retaining tab 150 and overlapping the lip 162 onto the outer surface 164 of the second retaining tab 151. As described above, the locking flanges 174 and 176 rest against the rear surface 257 at the opening 146 adjacent respective side walls 152 and 153. In operation, the force of fluid on the fluid encountering surface 178 and the resiliency of the body 132 act to hold the fluid control element 130 in place. As fluid indicated by direction arrow 180 (FIG. 8) flows through the fluid control element 130, sealing contact between the step 170 and first retention tab 150 is maintained. Any tendency of the fluid to force the fluid control element 130 away from the first retention tab 150 in a counterclockwise direction is resisted by the resiliency of the body 132 against the inner surface 172 and by the locking flanges 174 and 176 against the pump plate 256. Any tendency of the fluid to force the fluid control element 130 away from the second retention tab 151 in a clockwise direction is resisted by the resiliency of the lip 162 and the side walls 166 and 168 acting against the second retention tab 151.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A pump plate assembly for separating a pumping chamber and a reservoir of a viscous fluid clutch, wherein the pumping chamber receives fluid from a shear zone, the pump plate assembly comprising:
   (a) a plate member having a front surface in communication with the reservoir and a rear surface in communication with the pumping chamber; and
   (b) pressure-responsive fluid control means mounted on the pump plate, the fluid control means including
      (i) a resilient body,
      (ii) a chamber provided in the body having an inlet in communication with the pumping chamber, and
      (iii) a pair of convergent side walls in the chamber terminating in a normally-closed outlet in communication with the reservoir;
   whereby when a predetermined fluid pressure is reached in the pumping chamber, the side walls are forced apart to open the outlet, and when the fluid pressure falls below the predetermined level, the side walls return to their original position to close the outlet.

2. The pump plate assembly specified in claim 1 including wiper means mounted on the plate rear surface adjacent the fluid control means.

3. The pump plate assembly as specified in claim 1 including a circumferential groove provided in the body for receiving the pump plate.

4. The pump plate assembly as specified in claim 1 wherein a depression is provided in the pump plate so that an end surface of the fluid control means in communication with the pumping chamber is substantially planar with the plate rear surface.

5. The pump plate assembly as specified in claim 1 including a fluid encountering surface provided on the body adjacent the inlet, wherein the fluid encountering surface projects into the pumping chamber to produce a damming effect to enhance the pump-out of fluid from the pumping chamber.

6. The pump plate assembly as specified in claim 1 including retention means provided on the pump plate for retaining the fluid control means.

7. The pump plate assembly as specified in claim 6 wherein the retention means comprises:
   (a) a first retention tab projecting into the pumping chamber having an inner surface for engagement with a bottom surface of the body; and
   (b) a second retention tab projecting into the reservoir and having an outer surface for engagement with a top surface of the body.

8. The pump plate assembly as specified in claim 7 wherein the body includes:
   (a) a step in the bottom surface for receiving the inner surface of the first retention tab;
   (b) a lip on the top surface of the body for engaging the second retention tab; and
   (c) a pair of locking flanges on the bottom surface for resiliently supporting the body against the rear surface of the plate member.

9. A pump plate assembly for dividing the interior of a viscous fluid coupling into a working chamber and a reservoir, wherein the working chamber includes a pumping chamber for returning fluid from a shear zone back into the reservoir, the pump plate assembly comprising:
   (a) a plate member having a front surface in communication with the reservoir and a rear surface in communication with the pumping chamber;
   (b) pressure-responsive fluid control means mounted on the pump plate including
      (i) a resilient body,
      (ii) a chamber provided in the body and formed by a pair of angled side walls originating at an inlet in communication with the pumping chamber and terminating in a normally-closed outlet in communication with the reservoir, whereby the side walls open and close the outlet as a function of the fluid pressure in the body chamber; and
   (c) retention means provided on the pump plate for retaining the fluid control means including
      (i) a first retention tab projecting into the pumping chamber and having an inner surface for engagement with a bottom surface of the body, and
      (ii) a second retention tab projecting into the reservoir and having an outer surface for engagement with a top surface of the body.

10. The pump plate assembly as specified in claim 9 including locking means on the body for supporting the body against the pump plate.

11. The pump plate assembly as specified in claim 9 wherein the body includes a fluid encountering surface adjacent the inlet and projecting into the pumping chamber for increasing pressure fluid in the pumping chamber, thereby enhancing the pump-out of fluid through the fluid control means.

12. A method of preventing the migration of a viscous fluid in a viscous fluid coupling from a reservoir to a fluid shear zone, wherein the shear zone is in communication with a pumping chamber, the method comprising the steps of:
(a) separating the reservoir from the pumping chamber by a pump plate;
(b) piercing an opening in a portion of the pump plate in communication with both the pumping chamber and the reservoir;
(c) forming a first retention tab in a portion of the pump plate adjacent the opening so that the first retention tab projects into the pumping chamber;
(d) forming a second retention tab in a portion of the pump plate adjacent the opening so that the second retention tab projects into the reservoir;
(e) supporting a fluid control means in the opening by the first and second retention tabs, wherein the fluid control means includes a resilient body have a chamber formed by a pair of angled side walls originating at an inlet in communication with the pumping chamber and terminating in a normally-closed outlet in communication with the reservoir;
whereby the outlet is opened only in response to fluid pressure in the pumping chamber to permit only one-way fluid flow from the pumping chamber to the reservoir, thereby preventing fluid flow from the reservoir to the pumping chamber.

13. The method as specified in claim 12 wherein the fluid control means includes a locking means projecting from the body for supporting the body adjacent the opening.

14. The method as specified in claim 12 wherein the fluid control means includes a fluid encountering surface provided on the body adjacent the inlet and projecting into the pumping chamber to increase fluid pressure in the pumping chamber.

* * * * *